3,382,096
ANTISTATIC COMPOSITION, TREATMENT OF A HYDROPHOBIC MATERIAL THEREWITH, AND THE RESULTING MATERIAL
Harold Boardman, Chadds Ford, Pa., assignor to Hercules Incorporated, Wilmington, Del., a corporation of Delaware
No Drawing. Continuation-in-part of application Ser. No. 309,402, Sept. 17, 1963. This application Apr. 28, 1967, Ser. No. 634,501
30 Claims. (Cl. 117—139.5)

ABSTRACT OF THE DISCLOSURE

A composition of matter comprised of a water-soluble cationic thermosetting polyamide-epichlorohydrin resin and an antistatic agent is used to provide durable antistatic finishes on hydrophobic articles.

---

This application is a continuation-in-part of application Ser. No. 309,402, filed Sept. 17, 1963, now abandoned.

This invention relates to articles such as fabrics, filaments, film, molded articles, and the like of hydrophobic materials having a durable antistatic finish or coating thereon and to a method of producing same. It is particularly directed to improving the resistance to laundering of antistatic treatments of hydrophobic fabrics prepared from various types of synthetic fibers. This invention relates also to an aqueous coating composition comprised initially of a water-soluble cationic thermosettable resin and an antistatic agent.

In the manufacture of fabrics, antistatic agents are often included in the formulations added, as processing aids, to the yarn. The antistatic agent prevents or at least minimizes the accumulation of static electricity which often makes processing difficult, or which can constitute a shock hazard to personnel. For these purposes, the antistatic agent need not be permanent to laundering since it is preferably used with other processing aids (e.g., lubricans, sizing agents, and the like) which are subsequently removed. On the other hand, antistatic agents which are used for treating fabrics either before or after they are converted into end-use items such as rugs, clothing, and so on, for the purpose of eliminating shock to the user should be resistant to laundering since otherwise the antistatic effect is lost after a few washings thus necessitating retreatment of the fabric.

A principal object of the invention is to reduce the accumulation of static electrical charges on articles made from hydrophobic materials.

A further object of the invention is the provision of hydrophobic materials and articles formed therefrom having a durable antistatic finish.

Another object of the invention is a composition of matter comprised initially of an antistatic agent and a water-soluble cationic thermosetting polyamide-epichlorohydrin resin, which composition has particular utility in the treatment of surfaces of articles prepared from hydrophobic materials to provide thereon a durable antistatic coating or layer.

A more specific object of the invention is the provision of an improved antistatic treatment for hydrophobic fabrics which is more permanent, e.g., provides more resistance to laundering, than known treatments for this purpose.

Other objects and advantages of the invention will be apparent from the following description.

In accordance with this invention there is provided a novel composition of matter comprised of (a) an antistatic agent or compound and (b) a water-soluble cationic thermosettable or thermosetting polyamide-epichlorohydrin resin. The composition is applied as a coating to a surface of an article prepared from hydrophobic material (hereinafter sometimes referred to as a "hydrophobic article") such, for example, as a fiber, a fabric, a film, a molded article or the like, using water as a vehicle or carrier therefor.

Further, in accordance with the present invention, the development of static electrical charges on hydrophobic articles is prevented or at least substantially reduced by (1) applying to the surface thereof an aqueous composition comprised of (a) a cationic water-soluble thermosetting polyamide-epichlorohydrin resin and (b) an antistatic agent having both a reactive hydrogen containing group and a functional group capable of imparting antistatic properties to the hydrophobic article, (2) removing excess aqueous composition from the hydrophobic article, and (3) then curing the resin component to a water-insoluble state and simultaneously binding the antistatic agent in the cross-linked polymer network. When treated in this manner, hydrophobic articles, and particularly fabrics prepared from man-made fibers such as nylon, are quite resistant to laundering and dry cleaning operations.

Since the components of the composition of this invention are water-soluble, or a least water-dispersible, they can be conveniently applied to hydrophobic articles using water as the vehicle therefor. Any suitable method of application can be used such as by spraying, by brushing, by roll coating, and by immersion. In general, the aqueous compositions of this invention will desirably contain from about 1% to about 10% by weight of resin and from about 0.06% to about 2% by weight of antistatic agent. The method of application and the concentrations of ingredients in the solution are so regulated that the hydrophobic article surface retains from about 1% to about 10% by weight, based on the dry weight of the hydrophobic article, of resin solids and from about 0.06% to about 2% by weight, based on the dry weight of hydrophobic material, of the antistatic agent. The amount of antistatic agent utilized can be varied but should be such that from about 6% to about 30% by weight, based on the weight of resin, is retained by the hydrophobic material. Following application of the aqueous composition, any excess thereof is removed from the hydrophobic article surface, and the resin is cured or cross-linked to a water-insoluble state. Curing is desirably carried out at elevated temperatures of from about 90° C. to about 112° C. for from about 5 minutes to about 10 minutes; time varies inversely with the temperature. Temperatures and times outside these ranges can be utilized if desired. Temperatures at which decomposition of the hydrophobic articles takes place are to be avoided obviously.

The cationic polyamide-epichlorohydrin thermosettable or thermosetting resins used in preparing the composition of this invention are water-soluble polymeric condensation products of epichlorohydrin and a polyamide derived from a polyalkylene polyamine and a saturated aliphatic dicarboxylic acid. In the preparation of these products, the dicarboxylic acid is first reacted with a polyalkylene polyamine under conditions such as to produce a water-soluble polyamide containing the recurring groups —NH($C_nH_{2n}HN$)$_x$—CORCO— when $n$ and $x$ are each two or more and R is the divalent hydrocarbon radical of the dicarboxylic acid. This water-soluble polyamide is then reacted with epichlorohydrin to form a water-soluble cationic thermosetting resin.

The dicarboxylic acids contemplated for use in preparing these resins are diglycolic acid and saturated aliphatic dicarboxylic acids preferably containing from 3 to 8 carbon atoms such as succinic, glutaric, adipic and the like. Of these, diglycolic acid and the saturated aliphatic dicarboxylic acids having from 4 to 6 carbon atoms in the molecule, namely, succinic, glutaric and adipic, are most preferred. Blends of two or more of these dicarboxylic acids may also be used, as well as blends of one or more of these with higher saturated aliphatic dicarboxylic acids such as azelaic and sebacic as long as the resulting long-chain polyamide is water-soluble or at least water-dispersible.

A variety of polyalkylene polyamines including polyethylene polyamines, polypropylene polyamines, polybutylene polyamines and so on may be employed herein of which the polyethylene polyamines represent an economically preferred class. More specifically, the polyalkylene polyamines contemplated for use herein are polyamines containing two primary amine groups and at least one secondary amine group in which the nitrogen atoms are linked together by groups of the formula $$-C_nH_{2n}-$$

where $n$ is a small integer greater than unity and the number of such groups in the molecule ranges from two up to about eight, and preferably up to about four. The nitrogen atoms may be attached to adjacent carbon atoms in the group —$C_nH_{2n}$— or to carbon atoms further apart, but not to the same carbon atom. This invention contemplates not only the use of such polyamines as diethylenetriamine, triethylene tetramine, tetraethylenepentamine, dipropylenetriamine, and the like, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water, excess ammonia, and ethylenediamine is a very satisfactory starting material. Most preferred are the polyethylene polyamines containing from two to four ethylene groups, two primary amine groups, and from one to three secondary amine groups.

The term "polyalkylene polyamine" employed in the claims, therefore, refers to and includes any of the polyalkylene polyamines referred to above or to a mixture of such polyalkylene polyamines.

It is desirable, in some cases, to increase the spacing of secondary amine groups on the polyamide molecule in order to change the reactivity of the polyamide-epichlorohydrin complex. This can be accomplished by substituting an aliphatic diamine such as ethylenediamine, propylenediamine, hexamethylenediamine or a heterocyclic diamine such as piperazine or the like for a portion of the polyalkene polyamine. For this purpose, up to about 60% of the polyalkylene polyamine may be replaced by a molecularly equivalent amount of the diamine. Usually, a replacement of about 30% or less will serve the purpose.

The temperatures employed for carrying out the reaction between the dicarboxylic acid and the polyalkylene polyamine may vary from about 110° C. to about 250° C. or higher at atmospheric pressure. For most purposes, however, temperatures between about 160° C. and 210° C. have been found satisfactory and are preferred. Where reduced pressures are employed, somewhat lower temperatures may be utilized. The time of reaction depends on the temperatures and pressures utilized and will ordinarily vary from about ½ to 2 hours, although shorter or longer reaction times may be utilized depending on reaction conditions. In any event, the reaction is desirably continued to substantial completion for best results.

In carrying out the reaction, it is preferred to use an amount of dicarboxylic acid sufficient to react substantially completely with the primary amine groups of the polyalkylene polyamine but insufficient to react with the secondary amine groups to any substantial extent. This will usually require a mole ratio of polyalkylene polyamine to dicarboxylic acid from about 0.9:1 to about 1.2:1. However, mole ratios of from about 0.8:1 to about 1.4:1 may be used with quite satisfactory results. Mole ratios outside of these ranges are generally unsatisfactory. Thus, mole ratios below about 0.8:1 result in a gelled product or one having a pronounced tendency to gel, while mole ratios above 1.4:1 result in low molecular weight polyamides. Such products do not produce efficient resins for the purpose herein described when reacted with epichlorohydrin.

In converting the polyamide, formed as above described, to a cationic thermosetting resin, it is reacted with epichlorohydrin at a temperature from about 45° C. to about 100° C., and preferably between about 45° C. and 70° C., until the viscosity of a 20% solids solution at 25° C. has reached about C or higher on the Gardner-Holdt scale. This reaction is preferably carried out in aqueous solution to moderate the reaction. pH adjustment is usually not necessary. However, since the pH decreases during the polymerization phase of the reaction, it may be desirable, in some cases, to add alkali to combine with at least some of the acid formed.

When the desired viscosity is reached, sufficient water is then added to adjust the solids content of the resin solution to the desired amount, the product cooled to about 25° C. and then stabilized by the addition of acid. Any suitable acid such as hydrochloric, sulfuric, nitric, formic, phosphoric, and acetic acid, as well as various combinations of these, can be used for this purpose.

In the polyamide-epichlorohydrin reaction, it is preferred to use sufficient epichlorohydrin to convert all secondary amine groups to tertiary amine groups and/or quaternary ammonium groups including cyclic structures. However, more or less may be added to moderate or increase reaction rates. In general, it is contemplated utilizing from about 0.5 mole to about 1.8 moles of epichlorohydrin per mole polyamide secondary amine group. It is preferred to utilize from about 0.9 mole to about 1.5 moles of epichlorohydrin per mole of polyamide secondary amine groups.

The antistatic agents of which the composition of this invention is comprised have both a group containing a reactive hydrogen and a functional group capable of imparting antistatic properties to a hydrophobic material. Typical of the reactive hydrogen groups which can be present in these antistatic agents are

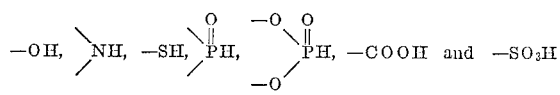

Typical of the functional groups imparting relatively good antistatic properties at all humidities are: —CON(Me)$_2$, —CON(Et)$_2$, —CONHMe, —COONa,

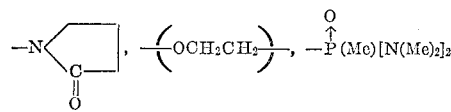

and —CONHCH$_2$NHCON(Me)$_2$. Acceptable antistatic properties at moderate humidity conditions (such as 30% RH) are imparted by compounds containing the following groups: —CONH$_2$, —SO$_3$H, —COOH, —N(CH$_3$)$_2$,

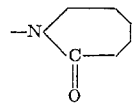

and —COOCH$_2$CH$_2$N(CH$_3$)$_2$.

Examples of antistatic agents containing the above types of groups are amides having the formulas:

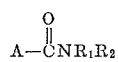

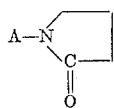

where $R_1$ is methyl, ethyl, or hydrogen, $R_2$ is methyl or ethyl, and A is an aliphatic radical with —OH, —$NH_2$, —$NHR_2$ or —SH substituted on one or more of the carbons; acids and their salts having the formulas

A—COOH
A—$SO_3H$ where A is the same as above; quaternary compounds having the formula:

$[A-N(R_2)_3]^+Q^-$ where A and $R_2$ are the same as above, and $Q^-$ is $NO_3^-$, $Cl^-$, or $(SO_4^=)\frac{1}{2}$; alcohols having the formulas A—$CH_2OH$
$HOCH_2(CH_2OCH_2)_nCH_2OH$ where A is the same as above, e.g., ethanolamine, diethanolamine, and the like, and $n$ is a number such as to provide compounds having an average molecular weight of from about 300 to 6000, or having the formula:

$RN(CH_2CH_2OCH_2CH_2OH)_2$ wherein R is alkyl of from 6 to 18 carbon atoms, and combinations of the above, e.g., a compound having the following formula:

$[C_{17}H_{35}CONH(CH_2)_3N(CH_3)_2CH_2CH_2]^+NO_3^-$

The following examples will illustrate the invention.

Example 1

A cationic polyamide—epichlorohydrin resin was prepared as follows:

Two hundred twenty-five parts of diethylenetriamine and 108 parts of water were placed in a reaction vessel and agitated. To this was added 327 parts of adipic acid. After the acid had dissolved in the amine, the solution was heated to 165–170° C. and held there until the reaction was completed. Then 503 parts of water was added. The resulting polyamide solution contained from 50.0% to 52.0% solids and had an intronsic viscosity at 25° C. from about 0.115 to about 0.125.

To 100 parts of this polyamide solution was added about 395 parts of water. This solution was heated to 50° C. and 25.5 parts of epichlorohydrin was added. The mixture was then heated at about 70° C. until it had attained a Gardner viscosity of D–E. Then 181.8 parts of water was added to the product, it was cooled to 27.5° C. ±2.5° C., and sufficient 10% HCl added to adjust the pH to about 5.0. The product contained about 10% solids and had a Gardner viscosity of C–D.

Specimens of fabrics made from Herculon (polypropylene fiber), Dacron (polyethylene terephthalate fiber), and nylon (polyamide fiber) were laundered by the standard Lanaset procedure (described below) using a wheel-type automatic washing machine. Following drying, the fabrics were dipped in 5% aqueous solutions of the cationic polyamide-epichlorohydrin resin prepared as above described containing 0.5% of various antistatic agents of the type hereinabove described. The fabrics were then passed between squeeze rolls to remove excess aqueous composition, dried at 225° F. for 10 minutes and then heated at 240° F. for 5 minutes. The add-on of cationic polyamide-epichlorohydrin resin was 5% (resin solids based on dry weight of fiber) in all cases. The add-on of antistatic agent was 0.5% by weight, based on the weight of dry fabric. Some of the treated fabrics were then subjected to a series of washings using the standard Lanaset procedure.

The antistatic performance of the above-treated fabrics was then compared with that of cotton fabric, as a control utilizing the following procedure.

A static charge was built up on strips of each fabric by frictional contact across metal bars. When the static charge on the fabric reached 1000 volts, the friction producing source was removed and the charge allowed to decay. The discharge time for the charge on each fabric relative to the discharge time for cotton fabric was noted. The results are reported in Table 1 below as better, equal to, or poorer than cotton.

TABLE 1

| Example | Additive | | pH of Soln. | Percent R.H. | Antistatic Performance After 5 Washes | | |
|---|---|---|---|---|---|---|---|
| | | | | | Herculon | Dacron | Nylon |
| 1 | Ethylene glycol | $HOCH_2CH_2OH$ | 8.7 | 30 | Better | | |
| 2 | Methyl diethyl hydroxyethyl ammonium nitrate. | 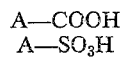 | 8.3 | 30 | ___do___ | | |
| 3 | Catanac SN [1] | 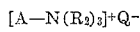 | 8.5 | 30 | ___do___ | Better | Equal. |
| 4 | ___do.[1] | Same as above | 8.4 | 15 | ___do___ | ___do___ | Better. |
| 5 | Diethanolamine | $(HOCH_2CH_2)_2NH$ | 10.0 | 30 | ___do___ | ___do___ | Do. |
| 6 | Monoethanolamine | $HOCH_2CH_2NH_2$ | 9.8 | 30 | ___do___ | Slightly worse. | Poor.[3] |
| 7 | Carbowax 400 [2] | $HO(-CH_2CH_2O)_n-H$ | 8.4 | 30 | ___do___ | Poor [3] | Do.[3] |
| 8 | N-2-hydroxyethylacetamide |  | 8.2 | 15 | ___do___ | | |
| 9 | Glycolic acid | $OHCH_2COOH$ | 9.0 | 15 | ___do___ | | |
| 10 | Glycine | $H_2NCH_2COOH$ | 9.0 | 15 | ___do___ | | |

[1] Stearamidopropyl dimethyl-β-hydroxyethyl ammonium nitrate.
[2] Low molecular weight poly(ethylene oxide).
[3] Much better than the same fabric which had not been given an antistatic treatment.

Examples 11 and 12

Samples of fabric made from Herculon [1] (polypropylene fiber) were laundered by the standard Lanaset procedure using a wheel-type automatic washing machine. Following drying, some of the samples were dipped in an aqueous composition containing 0.5% of the same type of antistatic agent and 5% of the same type of resin used in Examples 3 and 4, and the remaining samples were dipped in an aqueous composition containing 0.5% of the antistatic agent alone. The fabric samples were then passed between squeeze rolls to remove excess aqueous composition, dried at 225° F. for 10 minutes and then heated at 240° F. for 5 minutes. The add-on of antistatic agent was 0.5% by weight, based on the weight of dry fabric, in all cases, and the add-on of resin, where used, was 5% by weight, based on the weight of dry fabric. Some of the samples were then subjected to a series of washings using the standard Lanaset procedure.

The antistatic properties of the above-treated fabric samples were then compared utilizing the following procedure.

An attempt was made to build up a static charge on washed and unwashed strips of each fabric by frictional contact across metal bars. When the static charge on the fabric reached 1000 volts or when it became apparent that no static charge could be build up on the fabric, the friction-producing source was removed and the charge, if any, allowed to decay. The results are set forth in Table 2 below.

TABLE 2

| Example | Additive | Resin | Percent R.H. | Antistatic Properties | |
|---|---|---|---|---|---|
| | | | | No Washings | After 5 Washings |
| 11 | Same as Examples 3 and 4 | None | 30 | No charge could be built up. | Voltage dropped from 1,000 to 920 volts in 21 mins. |
| 12 | do | Same as Examples 3 and 4 | 30 | do | No charge could be built up. |

For purposes of comparison, the antistatic properties of a washed cotton fabric were tested in the same manner as the fabrics described above. The voltage dropped from 1000 to 900 in one minute.

The standard Lanaset procedure utilized in the examples consisted of using 0.1% Dash detergent in a 15-minute wash at 100° F. Following this, fabric samples received a 5-minute rinse, a draining, and then a 10-minute rinse. Rinsing was in fresh water at 100° F. Finally, specimens were centrifuged for 5 minutes.

It will thus be seen that the treatment in accordance with the present invention provides durable antistatic properties to hydrophobic articles such as synthetic fabrics. While the examples illustrate the application of the invention to various fabrics made from a number of hydrophobic materials, it will be appreciated that the invention is not limited thereto but is generally applicable to shaped articles of any hydrophobic material. In addition to those specifically exemplified and without limitation thereto, such hydrophobic materials may also include the cellulose esters such as cellulose acetate and cellulose acetobutyrate, resinous condensation polymers or addition polymers including polyamides such as nylon, polyesters such as ethylene glycol terephthalate, and vinyl and acrylic polymers such as polyethylene, polytetrafluoroethylene, polyvinyl chloride, polyisobutylene, polystyrene, copolymers of vinyl chloride with vinyl acetate, vinylidene chloride, acrylonitrile and acrylic esters and the like. Moreover, while the hydrophobic material can have any form, the invention is particularly useful and advantageous in connection with the handling of fibers, filaments, yarns and cords, fabrics made therefrom, and products such as rugs, clothing and the like into which the fabrics are converted.

It is to be understood that the above description is illustrative of this invention and not in limitation thereof.

[1] Registered trademark of Hercules Powder Co.

What I claim and desire to protect by Letters Patent is:

1. An aqueous coating composition consisting essentially of, by weight, (a) from about 0.06% to about 2% of an organic antistatic agent containing in addition to its antistatic functional group at least one other group containing reactive hydrogen, (b) from about 1% to about 10% of a water-soluble cationic thermosetting polyamide-epichlorohydrin resin, and (c) water.

2. The aqueous coating composition of claim 1 wherein the organic antistatic agent (a) contains in addition to its antistatic functional group at least one other group containing reactive hydrogen selected from the group consisting of —OH, >NH, —SH,

—COOH, SO₃H, and

3. The aqueous coating composition of claim 2 wherein the resin (b) is derived by reacting a polyalkylene polyamine with a dicarboxylic acid selected from the group consisting of diglycolic acid and $C_3$–$C_8$ saturated aliphatic dicarboxylic acids in a mole ratio of from about 0.8 to about 1.4 of the former to about 1.0 of the latter to form a long-chain polyamide, and then reacting the polyamide with epichlorohydrin in a mole ratio of epichlorohydrin to secondary amine groups of said polyamide of from about 0.5:1 to about 1.8:1.

4. The aqueous coating composition of claim 3 wherein antistatic agent (a) is a quaternary ammonium compound.

5. The aqueous coating composition of claim 4 wherein the quaternary ammonium compound is stearamidopropyl dimethyl-β-hydroxyethyl ammonium nitrate.

6. The aqueous coating composition of claim 4 wherein the quaternary ammonium compound is methyl diethyl hydroxyethyl ammonium nitrate.

7. The aqueous coating composition of claim 3 wherein antistatic agent (a) is diethanolamine.

8. The aqueous coating composition of claim 3 wherein antistatic agent (a) is ethylene glycol.

9. The aqueous coating composition of claim 3 wherein antistatic agent (a) is poly(ethylene oxide).

10. The aqueous coating composition of claim 3 wherein antistatic agent (a) is N-2-hydroxyethylacetamide.

11. The method of treating a hydrophobic article to impart antistatic properties thereto which comprises (I) applying to the surface of said article a coating of a coating composition consisting essentially of, by weight, (a) from about 0.06% to about 2% of an organic antistatic agent containing in addition to its antistatic functional group at least one other group containing reactive hydrogen, (b) from about 1% to about 10% of a water-soluble cationic thermosetting polyamide-epichlorohydrin resin, and (c) water, (II) removing substantially all water from the applied coating, and (III) curing the resin component of the applied coating to a water-insoluble state.

12. The method of claim 11 wherein the coating composition consists essentially of, by weight, (a) from about 0.06% to about 2% of an organic antistatic agent containing in addition to its antistatic functional group at least one other group containing reactive hydrogen selected from the group consisting of —OH, >NH, —SH,

—COOH, —SO₃H, and

(b) from about 1% to about 10% of a water-soluble cationic thermosetting polyamide-epichlorohydrin resin, and (c) water.

13. The method of claim 11 wherein the coating compostion consists essentially of, by weight, (a) from about 0.06% to about 2% of an organic antistatic agent containing in addition to its antistatic functional group at least one other group containing reactive hydrogen selected from the group consisting of —OH, >NH, —SH,

—COOH, —SO₃H, and

(b) from about 1% to about 10% of a water-soluble cationic thermosetting polyamide-epichlorohydrin resin derived by reacting a polyalkylene polyamine with a dicarboxylic acid selected from the group consisting of diglycolic acid and $C_3$–$C_8$ saturated aliphatic dicarboxylic acids in a mole ratio of from about 0.8 to about 1.4 of the former to about 1.0 of the latter to form a long-chain polyamide, and then reacting the polyamide with epichlorohydrin in a mole ratio of epichlorohydrin to secondary amine groups of said polyamide of from about 0.5:1 to about 1.8:1, and (c) water.

14. The method of claim 11 wherein the coating composition consists essentially of, by weight, (a) from about 0.06% to about 2% of a quaternary ammonium compound, (b) from about 1% to about 10% of a water-soluble cationic thermosetting polyamide-epichlorohydrin resin derived by reacting a polyalkylene polyamine with a dicarboxylic acid selected from the group consisting of diglycolic acid and $C_3$–$C_8$ saturated aliphatic dicarboxylic acids in a mole ratio of from about 0.8 to about 1.4 of the former to about 1.0 of the latter to form a long-chain polyamide, and then reacting the polyamide with epichlorohydrin in a mole ratio of epichlorohydrin to secondary amine groups of said polyamide of from about 0.5:1 to about 1.8:1, and (c) water.

15. The method of claim 11 wherein the coating composition consists essentially of, by weight, (a) from about 0.06% to about 2% of stearamidopropyl dimethyl-β-hydroxyethyl ammonium nitrate, (b) from about 1% to about 10% of a water-soluble cationic thermosetting polyamide-epichlorohydrin resin derived by reacting a polyalkylene polyamine with a dicarboxylic acid selected from the group consisting of diglycolic acid and $C_3$–$C_8$ saturated aliphatic dicarboxylic acids in a mole ratio of from about 0.8 to about 1.4 of the former to about 1.0 of the latter to form a long-chain polyamide, and then reacting the polyamide with epichlorohydrin in a mole ratio of epichlorohydrin to secondary amine groups of said polyamide of from about 0.5:1 to about 1.8:1, and (c) water.

16. The method of claim 11 wherein the coating composition consists essentially of, by weight, (a) from about 0.06% to about 2% of methyl diethyl hydroxyethyl ammonium nitrate, (b) from about 1% to about 10% of a water-soluble cationic thermosetting polyamide-epichlorohydrin resin derived by reacting a polyalkylene polyamine with a dicarboxylic acid selected from the group consisting of diglycolic acid and $C_3$–$C_8$ saturated aliphatic dicarboxylic acids in a mole ratio of from about 0.8 to about 1.4 of the former to about 1.0 of the latter to form a long-chain polyamide, and then reacting the polyamide with epichlorohydrin in a mole ratio of epichlorohydrin to secondary amine groups of said polyamide of from about 0.5:1 to about 1.8:1, and (c) water.

17. The method of claim 11 wherein the coating composition consists essentially of, by weight, (a) from about 0.06% to about 2% of diethanolamine, (b) from about 1% to about 10% of a water-soluble cationic thermosetting polyamide-epichlorohydrin resin derived by reacting a polyalkylene polyamine with a dicarboxylic acid selected from the group consisting of diglycolic acid and $C_3$–$C_8$ saturated aliphatic dicarboxylic acids in a mole ratio of from about 0.8 to about 1.4 of the former to about 1.0 of the latter to form a long-chain polyamide, and then reacting the polyamide with epichlorohydrin in a mole ratio of epichlorohydrin to secondary amine groups of said polyamide of from about 0.5:1 to about 1.8:1, and (c) water.

18. The method of claim 11 wherein the coating composition consists essentially of, by weight, (a) from about 0.06% to about 2% of ethylene glycol, (b) from about 1% to about 10% of a water-soluble cationic thermosetting polyamide-epichlorohydrin resin derived by reacting a polyalkylene polyamine with a dicarboxylic acid selected from the group consisting of diglycolic acid and $C_3$–$C_8$ saturated aliphatic dicarboxylic acids in a mole ratio of from about 0.8 to about 1.4 of the former to about 1.0 of the latter to form a long-chain polyamide, and then reacting the polyamide with epichlorohydrin in a mole ratio of epichlorohydrin to secondary amine groups of said polyamide of from about 0.5:1 to about 1.8:1, and (c) water.

19. The method of claim 11 wherein the coating composition consists essentially of, by weight, (a) from about 0.06% to about 2% of poly(ethylene oxide), (b) from about 1% to about 10% of a water-soluble cationic thermosetting polyamide-epichlorohydrin resin derived by reacting a polyalkylene polyamine with a dicarboxylic acid selected from the group consisting of diglycolic acid and $C_3$–$C_8$ saturated aliphatic dicarboxylic acids in a mole ratio of from about 0.8 to about 1.4 of the former to about 1.0 of the latter to form a long-chain polyamide, and then reacting the polyamide with epichlorohydrin in a mole ratio of epichlorohydrin to secondary amine groups of said polyamide of from about 0.5:1 to about 1.8:1, and (c) water.

20. The method of claim 11 wherein the coating composition consists essentially of, by weight, (a) from about 0.06% to about 2% of N-2-hydroxyethylacetamide, (b) from about 1% to about 10% of a water-soluble cationic thermosetting polyamide-epichlorohydrin resin derived by reacting a polyalkylene polyamine with a dicarboxylic acid selected from the group consisting of diglycolic acid and $C_3$–$C_8$ saturated aliphatic dicarboxylic acids in a mole ratio of from about 0.8 to about 1.4 of the former to about 1.0 of the latter to form a long-chain polyamide, and then reacting the polyamide with epichlorohydrin in a mole ratio of epichlorohydrin to secondary amine groups of said polyamide of from about 0.5:1 to about 1.8:1, and (c) water.

21. A composite member comprised of a hydrophobic article which in dry condition normally tends to develop static charges of electricity thereon and an adherent antistatic coating on the surface of said hydrophobic article, said antistatic coating consisting essentially of, by weight, from about 1% to about 10%, based on the weight of the hydrophobic article, of a thermoset polyamide-epichlorohydrin resin containing from about 0.06% to about 2%, based on the weight of the hydrophobic article, of an organic antistatic agent containing in addition to its antistatic functional group at least one other group containing reactive hydrogen.

22. The composite member of claim 21 wherein the organic antistatic agent is an organic antistatic agent which contains in addition to its antistatic functional group at least one other group containing reactive hydrogen selected from the group consisting of

—OH, >NH, —SH,

—COOH, —SO₃H, and

23. The composite member of claim 22 wherein the thermoset polyamide-epichlorohydrin resin is the cured product of a water-soluble thermosetting resin derived by reacting a polyalkylene polyamine with a dicarboxylic acid selected from the group consisting of diglycolic acid and $C_3$–$C_8$ saturated aliphatic dicarboxylic acids in a mole ratio of from about 0.8 to about 1.4 of the former to about 1.0 of the latter to form a long-chain polyamide, and then reacting the plyamide with epichlorohydrin in a mole ratio of epichlorohydrin to secondary amine groups of said polyamide of from about 0.5:1 to about 1.8:1.

24. The composite member of claim 23 wherein the antistatic agent is a quaternary ammonium compound.

25. The composite member of claim 23 wherein the antistatic agent is stearamidopropyl dimethyl-β-hydroxyethyl ammonium nitrate.

26. The composite member of claim 23 wherein the antistatic agent is methyl diethyl hydroxyethyl ammonium nitrate.

27. The composite member of claim 23 wherein the antitsatic agent is diethanolamine.

28. The composite member of claim 23 wherein the antistatic agent is ethylene glycol.

29. The composite member of claim 23 wherein the antistatic agent is poly(ethylene oxide).

30. The composite member of claim 23 wherein the antistatic agent is N-2-hydroxyethylacetamide.

References Cited

UNITED STATES PATENTS

| | | | |
|---|---|---|---|
| 2,836,517 | 5/1958 | Gruber et al. | 117—138.8 |
| 2,882,185 | 4/1958 | Valco et al. | 117—139.5 |
| 2,926,154 | 2/1960 | Keim | 260—29.2 |
| 2,961,347 | 11/1960 | Floyd | 117—139.5 |

WILLIAM D. MARTIN, *Primary Examiner.*

T. G. DAVIS, *Assistant Examiner.*

UNITED STATES PATENT OFFICE
CERTIFICATE OF CORRECTION

Patent No. 3,382,096                          May 7, 1968

Harold Boardman

It is certified that error appears in the above identified patent and that said Letters Patent are hereby corrected as shown below:

Column 5, line 36, "$[C_{17}H_{35}CONH(CH_2)_3N(CH_3)_2CH_2CH_2]^+NO_3^-$"
should read
$$[C_{17}H_{35}CONH(CH_2)_3N(CH_3)_2CH_2CH_2OH]^+NO_3^-$$

Signed and sealed this 16th day of September 1969.

(SEAL)
Attest:

Edward M. Fletcher, Jr.
Attesting Officer

WILLIAM E. SCHUYLER, JR.
Commissioner of Patents